United States Patent [19]

Curtis

[11] 3,977,703

[45] Aug. 31, 1976

[54] MULTIPLE DUCT UNDERGROUND CONDUIT

[76] Inventor: John S. Curtis, 6435 Gates Mills Blvd., Mayfield Heights, Ohio 44124

[22] Filed: Dec. 18, 1974

[21] Appl. No.: 533,931

[52] U.S. Cl. .................................. 285/26; 61/105; 285/137 R; 285/325; 285/DIG. 16
[51] Int. Cl.² .......................................... F16L 39/00
[58] Field of Search ........ 285/325, 326, 327, 137 R, 285/DIG. 16, 67, 24, 26, 25; 138/112; 61/72.1

[56] References Cited
UNITED STATES PATENTS

| | | | |
|---|---|---|---|
| 958,043 | 5/1910 | Stockley | 285/325 X |
| 1,761,075 | 6/1930 | Gest | 138/112 |
| 2,195,013 | 3/1940 | Rastetter et al. | 285/325 X |
| 2,279,733 | 4/1942 | Cross | 285/325 X |
| 2,324,791 | 7/1943 | McLoughlin et al. | 285/325 X |
| 2,701,147 | 2/1955 | Summerville | 285/137 R X |
| 2,933,428 | 4/1960 | Mueller | 285/DIG. 16 |
| 3,381,977 | 5/1968 | Metzger | 285/137 R X |
| 3,822,903 | 7/1974 | McNeely et al. | 285/DIG. 16 |
| 3,851,898 | 12/1974 | Ihara | 285/24 |
| 3,869,000 | 3/1975 | English | 285/325 X |

FOREIGN PATENTS OR APPLICATIONS

| | | | |
|---|---|---|---|
| 649,526 | 10/1962 | Canada | 285/325 |
| 862,370 | 11/1940 | France | 285/325 |

*Primary Examiner*—Thomas F. Callaghan
*Attorney, Agent, or Firm*—Donnelly, Maky, Renner & Otto

[57] ABSTRACT

Multiple duct underground conduit and method of installing the same which involves plastic tubing and male and female coupling plates which can be field assembled at the trench site to form sections which are then connected to each other in the trench without requiring someone in the trench. One form of the invention uses a wedge lock while the other employs a hook and latch, both forms simply requiring lowering of one section adjacent the other. Concrete may then be poured about the conduit in the trench and the trench covered.

27 Claims, 7 Drawing Figures

U.S. Patent Aug. 31, 1976 Sheet 1 of 2 3,977,703
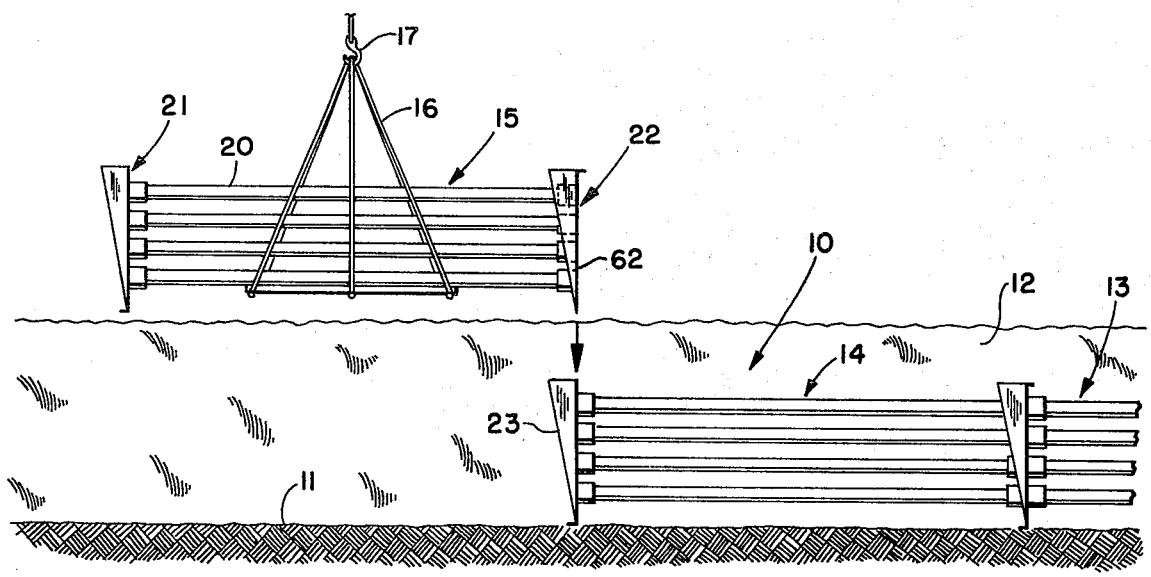
Fig. 1
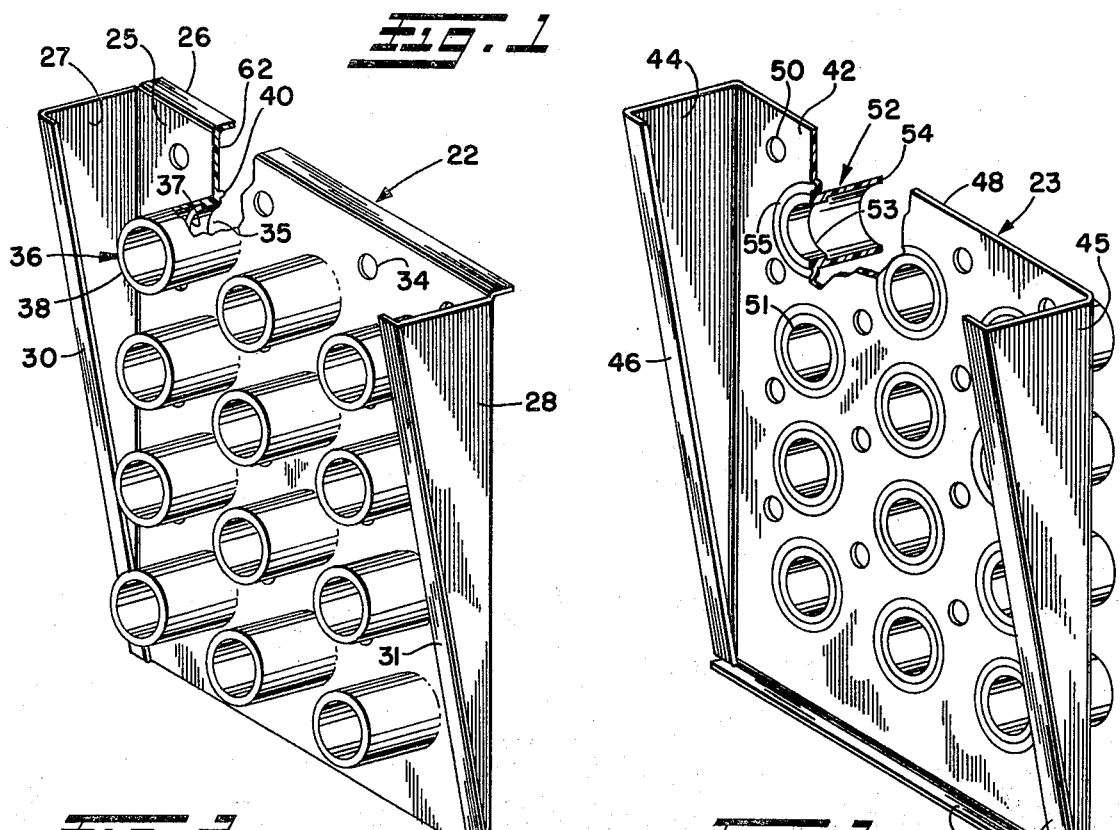
Fig. 2
Fig. 3
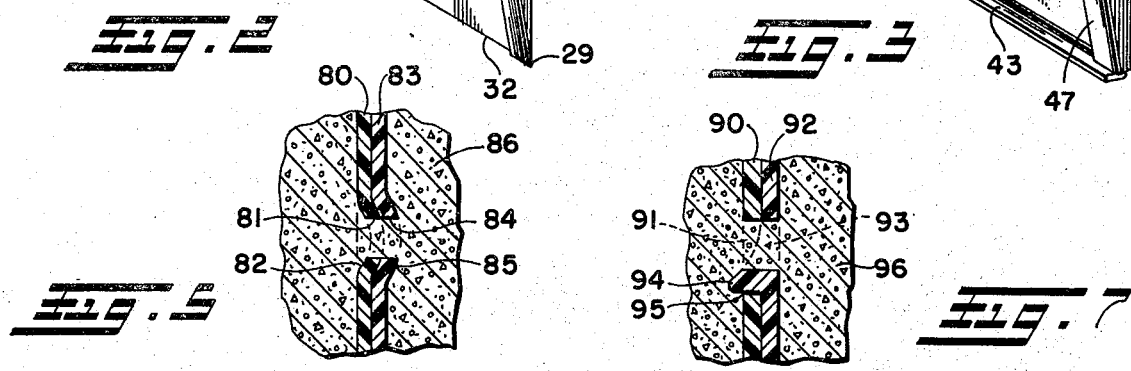
Fig. 5
Fig. 7

MULTIPLE DUCT UNDERGROUND CONDUIT

This invention relates generally as indicated to multiple duct underground conduit and a method of installing the same.

Multiple duct underground conduit is now being widely employed for underground telephone and electrical lines. The conduits are usually encased in concrete for protection. If preformed in sections as seen, for example, in Franklin U.S. Pat. No. 3,163,448, such sections must be transported to the trench site. If the conduit is encased in concrete after installation in the trench, complex spacers or saddle separators are employed as seen in Makowski U.S. Pat. No. 1,805,990. If separators are employed, the conduit bank must be constructed in the trench and if the trench is deeper than five feet and a man is required in the trench, complex and expensive shoring is required.

Concrete encased conduit sections present a complex construction, transportation and storage problem since it is easier and more economical to transport the conduit components to the trench side to field assembly and then encase the conduit banks in concrete or grout, which can be transported easily by ready-mix trucks. Also, if the conduit sections can be preassembled and placed in the trench without requiring a man in the trench, the shoring can be avoided, thus substantially reducing the cost of installing the underground conduit.

It is accordingly a principal object of the present invention to provide multiple duct underground conduit which can be assembled into sections at the trench site preferably in advance of the opening of the trench.

Another principal object is the provision of a multiple duct underground conduit wherein sections thereof can be connected together and properly aligned without requiring someone in the trench.

Another important object is the provision of a multiple duct underground conduit section properly spacing and supporting conduit whereby grout or concrete may be simply poured into the trench to fill the space between the conduits.

A still further important object of the present invention is the provision of a multiple duct underground conduit which may easily be preassembled at the trench site from few inexpensive and simplified parts.

Still another object is the provision of a unique method of laying multiple underground conduit not requiring preformed heavy concrete encased sections.

Yet another object is the provision of a method of laying underground multiple ducts which avoid expensive and time-consuming shoring of trenches.

Other advantages and objects of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 1 is a schematic sectional view of an open trench illustrating the multiple duct conduit sections of the present invention being connected to each other;

FIG. 2 is a perspective view, partially broken away and in section, of the male end plate of one of the multiple duct sections;

FIG. 3 is a view similar to FIG. 2 of the female end plate;

FIG. 5 is an enlarged fragmentary sectional view of one form of detent between the two connecting plates;

FIG. 7 is a view similar to FIG. 5 showing another form of detent which may be used, for example, with the FIG. 6 embodiment of the present invention.

Figure 4:
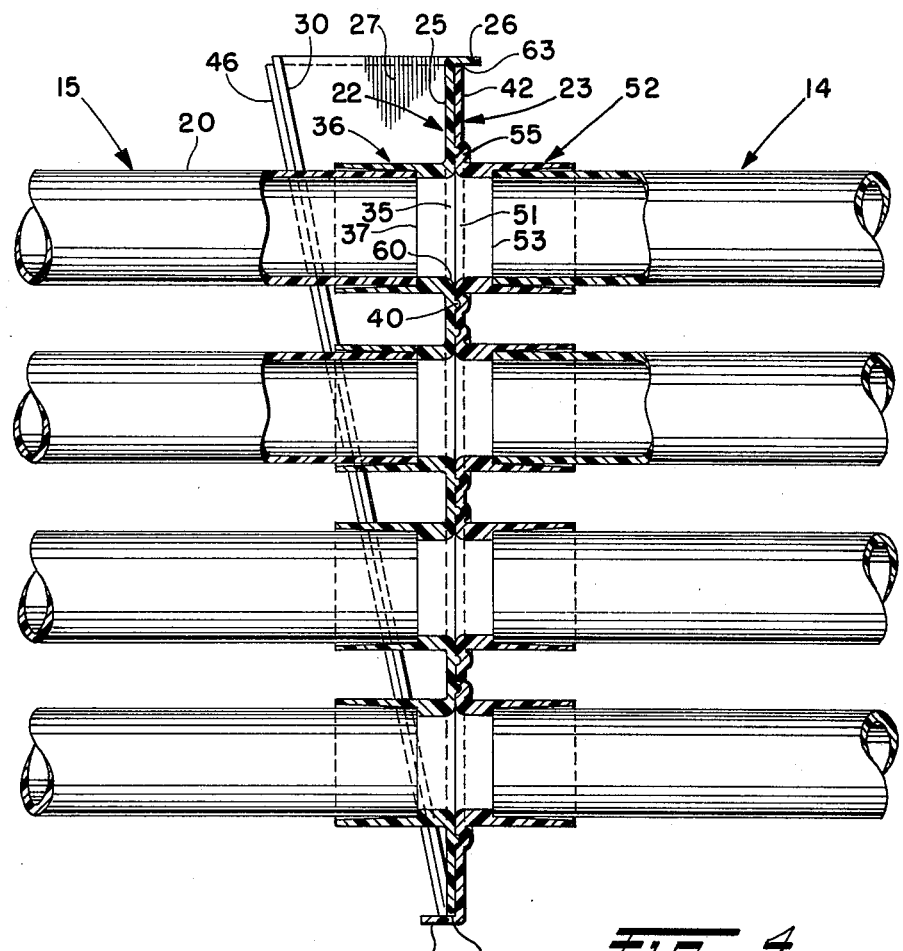
FIG. 4 is a vertical section through the male and female end plates of two sections joined to each other.

Referring now to the drawings, and more particularly to FIG. 1, there is illustrated a trench 10 having a bottom 11 and side walls 12. With modern excavating equipment, the bottom 11 can be formed level and the trench can be formed of a precise width. The bottom of the trench, may, if desired, be coated and packed with a layer of gravel. The forming of the trench to the precise dimensions to receive the multiple duct conduit may be accomplished quite quickly in uniform soil conditions with modern excavating equipment.

FIG. 1 illustrates sections 13 and 14 of multiple duct conduit in accordance with the present invention already situated and assembled in the trench. FIG. 1 also indicates a preassembled multiple duct conduit section 15 supported by sling 16 from crane hook 17 being lowered into the trench for assembly with the section 14.

Referring to the section 15, it will be seen that such section comprises a plurality of plastic conduit 20 extending between a female connector plate 21 and a male connector plate 22. As the section 15 is lowered, the male connector plate 22 of such section will mate with the female connector 23 of the section 14 already in the trench. The female connector plate 23 of the section 14 is, of course, identical to the female connector plate 21 of the section 15. The male connector plates of each section are also identical.

The male connector plate 22 is shown in detail in FIG. 2, while the female connector plate 23 is shown in detail in FIG. 3, and both are shown mated in the sectional view of FIG. 4.

Referring first to the male connector plate 22 shown in FIG. 2, it will be seen that the plate comprises a vertically extending main plate 25 having a relatively short top horizontal flange 26. The main plate is provided with triangular side flanges 27 and 28 which taper to a relatively sharp acute angle or point indicated at 29. Such side flanges are each provided with relatively short inturned bearing flanges as indicated at 30 and 31, respectively. The lower edges of the bearing flanges 30 and 31 are flush with and adjacent the bottom edge 32 of the main plate 25.

The main plate is provided with a plurality of regularly spaced small apertures 34, the purpose of which is to permit concrete or grout to flow therethrough. The main plate 25 is also provided with larger, regularly spaced apertures 35, each of which is provided with a projecting tube coupling hub or boss 36. The I.D. of the boss is provided with a shoulder 37 of the same radial depth as the wall thickness of the plastic conduit or tube 20. The I.D. of the boss from the shoulder 37 to the end 38 of the boss is slightly flared for ease of molding and for ease of insertion of the conduit. The face of the main plate 25 opposite the projecting boss 36 is provided with a slight annular detent ridge 40 which surrounds the aperture 35 and is slightly spaced therefrom. In the illustrated embodiment, there are twelve regularly spaced conduit coupling bosses on the interior face of the main plate of the male coupling plate.

Referring now to FIG. 3, it will be seen that the female coupling plate comprises a main vertical plate 42 having a bottom horizontal flange or foot 43 and triangular side flanges 44 and 45 which are laterally spaced snugly to embrace the side flanges 27 and 28 of the male coupling plate 22. The triangular side flanges 44 and 45 are provided with inturned bearing flanges 46 and 47, respectively, which will embrace the bearing flanges 30 and 31 of the male coupling plate. Accordingly, the triangular side flanges 44 and 45 are spaced slightly further apart than the side flanges 27 and 28, and the bearing flanges 46 and 47 are spaced slightly further from the main plate 42 than are the bearing flanges 30 and 31. This permits the male coupling plate to fit snugly within the side flanges of the female coupling plate until the bottom edge 32 bottoms against the foot or bottom flange 43. In such mating condition, the top flange 26 of the male coupling plate will overly the top edge 48 of the female coupling plate.

The main plate 42 is provided with a plurality of regularly spaced small apertures 50 each corresponding to one of the apertures 34 in the male coupling plate. Larger apertures 51 are provided in the main plate 42, such apertures corresponding in location and size to the apertures 35 in the male coupling plate. Tube coupling bosses 52 project from the exterior of the main plate 42 at the apertures 51 and each boss is provided with an internal shoulder 53 of the same radial thickness as the wall thickness of the conduit. Again the boss I.D. tapers slightly from the shoulder 53 to the end 54 of the boss to facilitate the placement of the conduit ends therein. On the inside of the main plate 42 surrounding each aperture 51 is an annular detent groove 55 designed to mate with the detent ridge 40 on the inside of the main male plate 25. The annular detent ridges and grooves not only lock the two plates in proper mating condition but serve to seal the interior of the apertures and thus the interior of the conduits against egress of grout or concrete which will surround the sections before the trench is backfilled.

Referring now to FIG. 4, there is illustrated the male and female coupling plates in mating engagement. The male coupling plate has been lowered until the bottom edge 32 rests upon the top of the footing flange 43 and if necessary to secure the plates properly together, a slight force may be applied to the top flange 26 by tapping the same with the end of a 2 × 4, for example. In such mating engagement, the detent rings 40 will snap into the detent grooves 55 surrounding the now aligned mating apertures 35 and 51. As noted more clearly in FIG. 4, the edges of the apertures 35 and 51 may be provided with a slight radius as indicated at 60 so that there will be no projecting corners on the inside of the conduit which might tend to make more difficult the feeding or fishing of electrical wiring through the conduits. The I.D. of the boss from the apertures 35 to the shoulder 37 is the same as the I.D. of the conduit 20 so that the boss forms a continuation of the interior surface of the conduit.

The conduit as well as the male and female coupling plates is preferably formed of a thermoplastic material. The conduit may be formed by the conventional extrusion process, while the male and female coupling plates may be formed by a vacuum forming process. PVC, ABS or styrene thermoplastics are examples of useful materials. The coupling plates may, for example, be approximately ⅛ inch thick, and the dimension such as the length of the bosses may vary. Also, the configuration of the aligned apertures in the plates may vary. The openings should, however, be as large as possible without adversely affecting the rigidity of the plates. The length of the conduits between the plates may be approximately ten feet, but this may be shortened or lengthened depending upon the beam strength of the ducts. It is important that the ducts should not sag between the plates. The diameter of the ducts may vary from, for example, 1½ inches to 6 inches, and the ducts may be separated from about 1 inch to about 3 inches on ½ inch increments. The slight taper on the I.D. of the boss from the shoulder to the end is also employed for ease of molding and for obtaining a resistant fit when the conduit is positioned in the boss and solvent cemented in place.

In the final assembly of the FIG. 4 embodiment, solvent cement may be applied to the face 62 of the male plate 22 before the section 15 is lowered to its final position. The male coupling plate should be seated so that the top flange 26 is in tight abutment with the top edge 48 of the female coupling plate as indicated at 63 so that concrete cannot enter between the plates.

Figure 6:
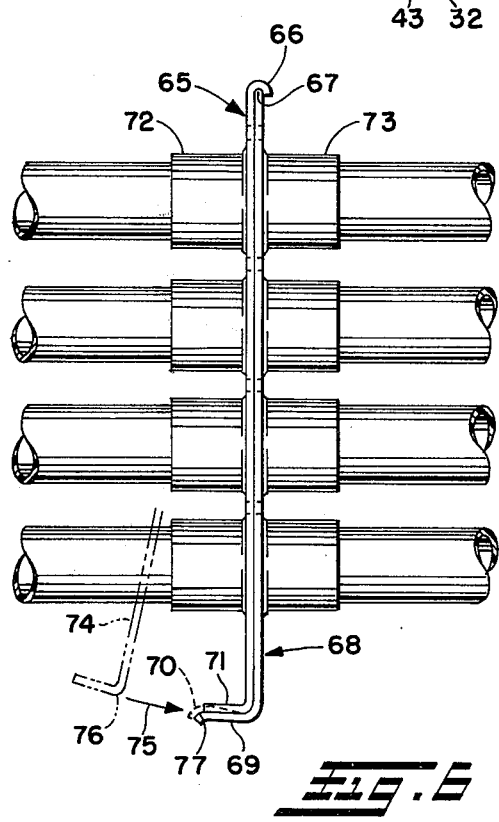
FIG. 6 is a side elevation of another form of the present invention.

Referring now to FIG. 6, there is illustrated another form of the invention wherein the male coupling plate 65 is provided with a hook 66 along the top edge thereof designed to engage over the rounded upper edge 67 of the female plate 68. The bottom edge of the female plate 68 is provided with a foot flange 69, the normal position of which is shown in phantom lines 70. The bottom edge of the male coupling plate is also provided with a horizontal flange 71 which may be inclined upwardly slightly. The tube coupling bosses 72 and 73 projecting from the male and female coupling plates may be of the same construction as shown in FIG. 4. For assembly, solvent cement may be applied to the face of the male plate 65 as indicated at 74 and the section lowered until the hook 66 engages the top edge 67 of the female coupling plate of the section already in the trench. The section being lowered is at a slight angle and continued lowering causes the section to pivot to a horizontal position as indicated by the arrow 75. The heel 76 formed by the flange 71 engages the rounded top projecting edge 77 of the flange 69 camming the latter downwardly. Continued lowering of the section moves the male plate 65 to a vertical position with the heel 76 of the flange 71 nested in the heel of the flange 69. The resilient characteristics of the plastic forming the flange lock the two plates together.

FIG. 5 illustrates a form of aperture and detent which may be utilized, for example, with the FIG. 4 embodiment. The male plate 80 is provided with an aperture 81 formed in the center of a dimple 82, while the female plate 83 is likewise formed with an aligned aperture 84 formed in the center of a dimple 85. The dimples are formed such that the dimple on the male plate will nest snugly within the dimple on the female plate. As indicated, a concrete matrix 86 may be employed with concrete extending through the aligned apertures.

In FIG. 7, there is shown the male plate 90 which may have a plain circular aperture 91 therein. The female plate 92 is provided with an aperture 93, somewhat smaller than the aperture 91, but which has a projecting lower lip 94, circular in form which extends through the aperture 91 and fits snugly on the bottom circular edge 95 thereof. The FIG. 7 form of detent may be used with the FIG. 6 embodiment. As in FIG. 5, a concrete matrix 96 may be provided. The detent arrangement of both FIGS. 5 and 7 ensures proper alignment of the plate and further keeps concrete or grout from entering between the plates.

It will now be seen that there is provided a multiple duct underground conduit where the sections can be preassembled at the site of the trench prior to the opening of the trench. The only components of the sections are the ducts and the male and female coupling plates, and these components can be shipped very economically to the trench site for preassembly above ground. The labor requirements for preassembly above ground are of course, less costly than labor requirements for assembly within the trench. Moreover, weather is not a factor in the preassembly since the work can be accomplished in rain or snow. The worker simply solvent cements the ducts into the male and female coupling plates and then spaces the same along the trench to be dug. When the trench is opened and the bottom properly prepared, the sections are then placed in the trench as shown in FIG. 1, and the assembly, all from above the trench, places the ducts in proper alignment and keeps the plates sealed to keep dirt and concrete out of the conduits. As soon as the sections are placed, concrete may be poured around the conduit. The material around the conduits may, however, be sand or earth. Concrete is, however, usually employed to protect or prevent accidental dig-ins or severing by surface loading. With the present invention, the length of time the trench must be open is substantially reduced. The present invention also eliminates the employment of separators or saddle spacers now in common use and, moreover, eliminates coupling the conduits by a bell and spigot joint. Most importantly, the sections can be assembled in the trench without requiring a man in the trench thereby eliminating the need for costly shoring.

I therefore, particularly point out and distinctly claim as my invention:

1. An underground multiple duct conduit system section for permanent installation in a trench, and adapted to be connected to identical sections to form a continuous underground multiple duct conduit system, each section comprising a plurality of parallel, equal length, single bore, semi-rigid, plastic electrical duct, and coupling plates on each end of the section, said duct and coupling plates being adapted to be preassembled before placement in the trench to form said section, and means on said coupling plates operative to connect and align the duct of one section with the duct of another in response to the lowering of the one assembled section into the trench adjacent another assembled section already in the trench.

2. A conduit section as set forth in claim 1 wherein each coupling plate has a substantially planar mating surface, and integrally formed duct connecting bosses projecting from the surface opposite the mating surface.

3. A conduit section as set forth in claim 2 including a duct shoulder stop in each boss, said shoulder stop having substantially the same radial thickness as the wall thickness of the duct.

4. A conduit section as set forth in claim 3 wherein the I.D. of the boss from the shoulder stop to the outer end of the boss tapers slightly.

5. A conduit section as set forth in claim 3 wherein the I.D. of the boss from the shoulder stop to the mating surface is substantially the same as the I.D. of the duct.

6. A conduit section as set forth in claim 3 wherein the I.D. of the boss extends through an aperture in the planar mating surface and has a radiused edge at such planar mating surface.

7. A conduit section as set forth in claim 2 wherein said plates are slightly deformable plastic, each including mating detent means on the mating surfaces adapted to interfit when said sections are connected and aligned as aforesaid.

8. A conduit section as set forth in claim 7 wherein said detent means includes apertures in said coupling plates which are aligned when said sections are connected and aligned as aforesaid.

9. A conduit section as set forth in claim 7 wherein said detent means includes respective annular ridges and grooves on the mating surfaces interfitting when the sections are connected and aligned as aforesaid.

10. A conduit section as set forth in claim 7 wherein said detent means includes a projection on one mating surface adapted to project through an aperture in the other when the sections are connected and aligned as aforesaid.

11. A conduit section as set forth in claim 1 including wedge flanges on said plates at each side edge thereof, the wedge flanges on one plate fitting within the wedge flanges on the other as the one is lowered into the trench.

12. A conduit section as set forth in claim 11, wherein said wedge flanges are in the form of triangular flanges on the edges of said plates and normal thereto, and inturned bearing flanges on the edges of said triangular flanges.

13. A conduit section as set forth in claim 11 including a foot flange on one plate supporting said another section already in the trench and adapted to engage the bottom edge of the mating plate when the sections are connected and aligned as aforesaid.

14. A conduit section as set forth in claim 13 including a top flange on the mating plate adapted to engage the top edge of the other already in the trench when the sections are connected and aligned as aforesaid.

15. A conduit section as set forth in claim 1 including a hook along the top edge of one plate adapted to engage the top edge of the other when the sections are connected and aligned as aforesaid.

16. A conduit section as set forth in claim 15 including a flange on the bottom edge of said one plate adapted to engage a resilient latching flange on the bottom edge of the other when the sections are connected and aligned as aforesaid.

17. A conduit section as set forth in claim 16 wherein said resilient latching flange is provided with a rounded upper edge adapted to be engaged and cammed by the movement of the heel of the flange on the bottom edge of said one plate when the sections are connected and aligned as aforesaid.

18. A section as set forth in claim 2 wherein said coupling plates are plastic, said ducts and plates being connected by a solvent cement within said bosses when preassembled before placement in the trench.

19. An underground multiple duct conduit system for permanent installation in trenches comprising a plurality of identical interconnected tube bank sections, each section having vertically extending end plates with a plurality of parallel, equal length, single bore, semi-rigid plastic electrical duct extending therebetween, whereby said sections may be preassembled outside of the trench, and means on said end plates to connect and align the duct of adjacent sections in the trench without requiring the presence of someone in the trench.

20. A system as set forth in claim 19 wherein the end plates of each section are provided with side wedge flanges whereby when one section is lowered into the trench, the wedge flanges will mate joining and aligning the lowered section with one already in the trench.

21. A system as set forth in claim 19 including detent means on the mating faces of said end plates.

22. A system as set forth in claim 19 wherein one of the end plates is provided with a hook along the top edge thereof whereby when one section is lowered into the trench, said hook will engage the top edge of the opposite plate of a section already in the trench.

23. A system as set forth in claim 22 wherein continued lowering of said one section pivots the end plate about such hook until the end plate is parallel and juxtaposed to the end plate to which it is hooked.

24. A system as set forth in claim 23 including latch means at the bottom of said plates to hold the same in such parellel and juxtaposed condition.

25. A system as set forth in claim 19 wherein the end plates are plastic and have substantially planar mating faces which are solvent cemented together when connected in the trench.

26. A system as set forth in claim 19 wherein said end plates are plastic, and said plastic electrical duct is solvent cemented to said end plates when preassembled outside of the trench.

27. A system as set forth in claim 19 wherein said end plates are provided with apertures which are aligned with apertures in the adjacent end plate when adjacent sections are connected and aligned as aforesaid whereby concrete can flow therethrough.

* * * * *